May 21, 1963  M. M. J. HALL  3,090,895
CAPACITORS
Filed Feb. 16, 1959  5 Sheets-Sheet 1
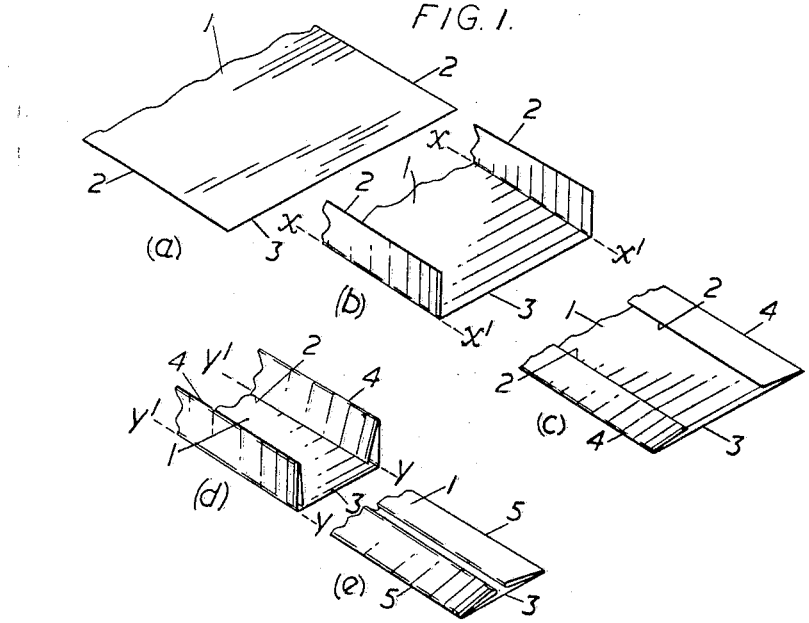
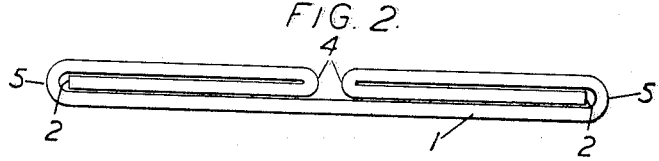
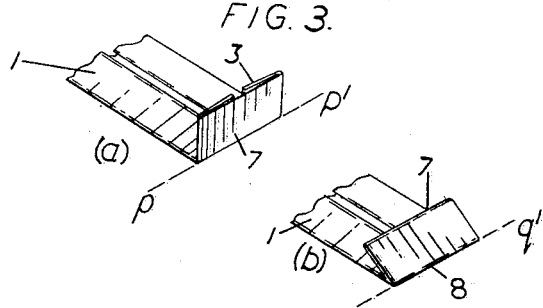
Inventor
Michael Maurice James Hall
By
Webb, Mackey & Burden Attorneys

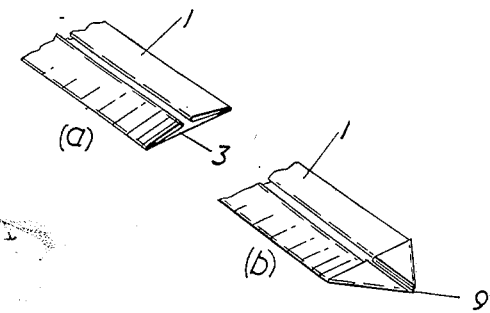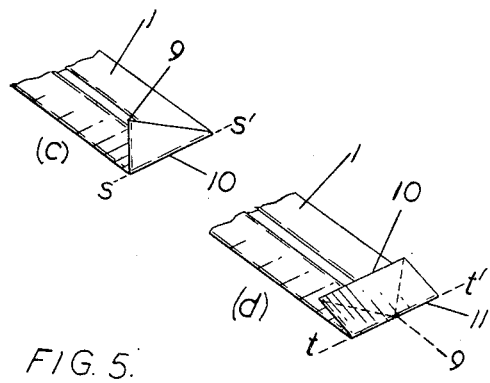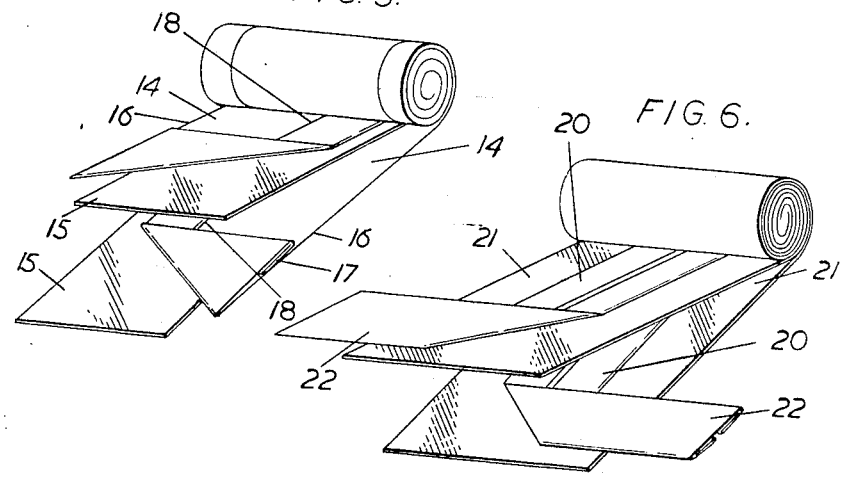

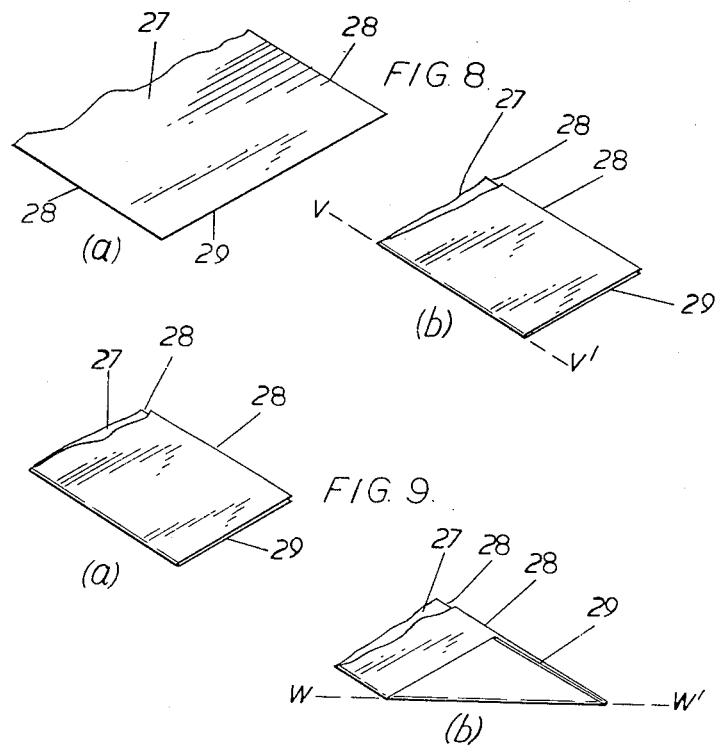

May 21, 1963   M. M. J. HALL   3,090,895
CAPACITORS
Filed Feb. 16, 1959   5 Sheets-Sheet 5
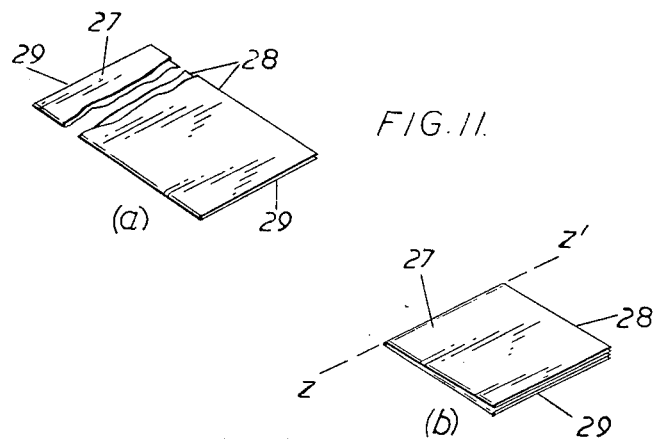
FIG. 11.
FIG. 12.
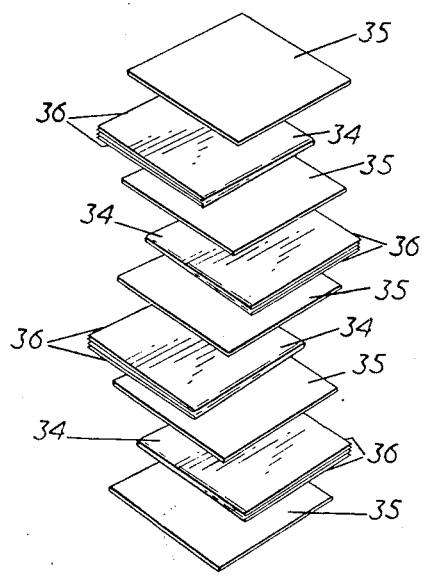
Inventor
Michael Maurice James Hall
By
Webb, Mackey & Burden Attorneys 2,090,895
Patented May 21, 1963

3,090,895
CAPACITORS
Michael Maurice James Hall, Stadhampton, Oxford, England, assignor to British Dielectric Research Limited, London, England, a company of Great Britain
Filed Feb. 16, 1959, Ser. No. 793,544
Claims priority, application Great Britain Feb. 19, 1958
4 Claims. (Cl. 317—260)

This invention relates to electric capacitors. It is concerned with condenser bushings and capacitors of the wound type comprising electrodes and interleaving strips of insulating material wound up together into a roll. It is also concerned with capacitors of the stack type comprising a plurality of superposed layers of conducting material and interleaving layers of dielectric material. More particularly it is concerned with capacitors of the kind having one or more than one electrode that is formed of metal foil or of metallized paper or of metallized plastics film.

In accordance with the present invention an electric capacitor is provided having at least one of its electrodes formed of a sheet of metal foil or of metallized paper or of metallized plastics film, folded in such a way as to prevent contact between a raw edge of the electrode and the layer or layers of dielectric lying next to that electrode.

Folding of the sheet of metal foil or of metallized paper or of metallized plastics film forming an electrode may be such as to bring two opposite raw edges of the electrode together or in close proximity. Alternatively, folding of the sheet of metal foil or of metallized paper or of metallized plastics film may be such as to result in at least one raw edge of the sheet being completely screened by other parts of the same sheet.

In the first case the folded sheet is so positioned in the capacitor that the raw edges opposite the folded edge project beyond the capacitor dielectric. Where the capacitor is a wound capacitor the sheet will preferably be folded along a central longitudinal line prior to or during the operation of winding the capacitor. One or both ends of the sheet may also be folded to bring its raw edges alongside the longitudinal raw edges or be folded so that the end raw edge is completely screened by other parts of the same sheet. Where the capacitor is a stack type capacitor, after folding the sheet of metal foil or of metallized paper or of metallized plastics film to bring two opposite edges together or into close proximity, the folded sheet may be again folded at right angles to the first fold to bring its remaining opposite edges together or into close proximity with one another. The twice-folded sheet will then be positioned in the stack with all its raw edges projecting beyond the stack.

Where folding of the metal foil or of metallized paper or of metallized plastics film is such as to result in one or both longitudinal raw edges of the sheet being completely screened by other parts of the same sheet, the sheet may be positioned in the capacitor so that that screened raw edge or both screened raw edges lie within the capacitor dielectric, whether the capacitor be of the wound or stack type. In some cases a third or both a third and a fourth raw edge of the sheet may also be completely screened by other parts of the sheet.

Complete screening of a raw edge of a sheet of metal foil or of metallized paper or of metallized plastics film by other parts of the same sheet is effected by folding the sheet along a line extending lengthwise of the sheet and spaced from that edge and folding it again in the same sense along a second line extending lengthwise of the sheet to cause the raw edge to lie in the bottom of the second fold. Preferably, the lines along which the sheet is folded are parallel to the longitudinal raw edges of the sheet. Where the sheet is to form one of two axially staggered convolute electrodes of which one edge of one protrudes from one end of the roll and one edge of the other protrudes from the other end of the roll, it may suffice to screen in this way that one of the two longitudinal raw edges of each electrode that does not so protrude. Preferably however and also in cases where neither edge protrudes from an end of the roll both longitudinal raw edges are screened by double folding each longitudinal edge in the manner described above. In this case it is an advantage so to fold that on completion of the four folding operations the two first folds lie near together and adjacent the centre line of the original sheet.

At one or both ends the folded sheet electrode may be folded at an angle of about 45° to its longitudinal edges to form an integral tap protruding from the end of the wound capacitor. Alternatively one end may be so folded to form a tap and the other be twice folded along lines at right angles to the longitudinal edges so as to completely screen the end raw edge of the sheet by other ports of the sheet. With this alternative method of twice folding an end at right angles to the longitudinal edges, it is preferable as a preliminary to doing so to fold over the corners of the end of the sheet so that after the subsequent folding operations the risk of complete screening of a raw edge throughout its complete length not being attained owing to one corner or the other protruding laterally of the double folded end is eliminated.

In the case of a stack type capacitor some or all of the sheets of metal foil or of metallized paper or of metallized plastics film forming electrodes may be double folded along each edge to completely screen each raw edge by other parts of the same sheet, or they may be double folded in this way along three sides of the sheet leaving the fourth unfolded side to project from one side of the stack for connection purposes. In each case where advisable, two or all of the corners may be folded over as described in the preceding paragraph to eliminate the risk of one or more corners protruding from the double folded portions of the sheet.

The invention may also be applied to the manufacture of condenser type bushings whose electrodes are constituted by layers of metal foil inserted at intervals as the laminated wall of the bushing is being wound.

The invention will be more fully described with reference to the accompanying diagrammatic drawings, in which:

FIGURES 1a to 1e inclusive illustrate a series of stages in the preferred method of completely screening both longitudinal raw edges of a sheet electrode;

FIGURE 2 is an end view of a sheet electrode which has been double-folded by the method illustrated diagrammatically in FIGURE 1;

FIGURES 3a and 3b illustrate a two-stage method of screening an end raw edge of a double-folded sheet electrode;

Figure 7:
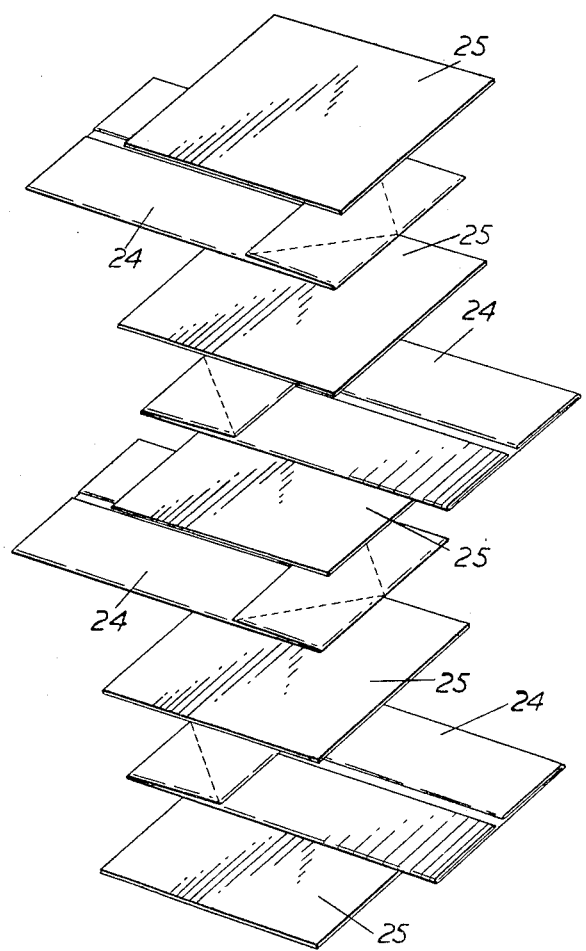

FIGURES 4a to 4d inclusive illustrate a series of stages in the preferred method of completely screening an end raw edge of a double-folded sheet electrode;

FIGURE 5 is an isometric view of an example of a partly wound capacitor having two axially staggered convolute electrodes;

FIGURE 6 is an isometric view of a second example of a partly wound capacitor;

FIGURE 7 is an exploded isometric view of an example of a capacitor of the stack type;

FIGURES 8a and 8b illustrate an alternative method of folding a sheet electrode;

FIGURES 9a and 9b illustrate the preferred method of folding an end of a sheet electrode which has been single-folded by the method illustrated diagrammatically in FIGURE 8;

FIGURE 10 is an isometric view of a third example of a partly wound capacitor having two axially staggered convolute electrodes;

FIGURES 11a and 11b illustrate an alternative method of double-folding a sheet electrode, and FIGURE 12 is an exploded isometric view of a second example of a capacitor of the stack type.

A sheet 1 of metal foil, which is shown in FIGURE 1a and which is to be the sheet electrode of an electric capacitor, has a pair of longitudinal raw edges 2 and a pair of end raw edges 3. Each longitudinal raw edge 2 is screened, as shown in FIGURES 1b and 1c, by folding the sheet 1 along lines $xx'$ to form first folds 4, each line $xx'$ being parallel to, and spaced approximately one-sixth of the width of the sheet from, the corresponding longitudinal raw edge being screened. The sheet 1 is then folded a second time in the same sense along lines $yy'$, as shown in FIGURES 1d and 1e, to form second folds 5, each line $yy'$ being parallel to, and spaced approximately one-sixth of the width of the sheet from, the corresponding fold 4. On referring to FIGURE 2, it will be seen that as a result of double folding the sheet 1 as described, each longitudinal raw edge lies in the bottom of its corresponding second fold 5 and is therefore screened by other parts of the same sheet. The two first folds 4 lie near together and adjacent the centre line of the original sheet.

On referring to FIGURES 3a and 3b it will be seen that in order to screen the end raw edge 3 of the double-folded sheet 1, the sheet is first folded along a line $pp'$ at right angles to the longitudinal edges of the sheet to form a first fold 7 and is then folded a second time along a line $qq'$ parallel to and spaced from the first fold to form a second fold 8. As a result of double folding the end of the double-folded sheet 1, the end raw edge 3 is brought into the bottom of the second fold 8 so as to be screened by other parts of the same sheet.

In the first step of the preferred method of completely screening the end raw edge 3 of the double-folded sheet 1 shown in FIGURES 4a and 4b, the two corners of the end of the sheet are each folded over in the same sense along a line approximately at 45° to the longitudinal edges of the sheet to form an apex 9 at the end raw edge 3. The double-folded sheet 1 is then folded along a line $ss'$ at right angles to the longitudinal edges of the sheet, as shown in FIGURE 4c, to form a first fold 10 and is folded a second time along a line $tt'$ parallel to and spaced from the first fold, as shown in FIGURE 4d, to form a second fold 11, the apex 9 thus being brought into the bottom of the second fold. By using this preferred method of completely screening the end raw edge 3 of the double-folded sheet 1, the risk of one corner or the other of the end raw edge protruding laterally of the double-folded end obtained by the method of screening described with reference to FIGURES 3a and 3b is eliminated.

The partly wound capacitor illustrated in FIGURE 5 has a pair of axially staggered sheet electrodes 14 and interleaving strips 15 of insulating material wound up together into a roll. For connection purposes, the longitudinal raw edge 16 of one of the electrodes protrudes from one end of the roll and the longitudinal raw edge 16 of the other electrode protrudes from the other end of the roll. The longitudinal raw edge 17 of each electrode which does not protrude from the roll is screened by the electrode being double-folded in the manner described, the first folds 18 of each of the electrodes lying adjacent the centre line of the insulating strips 15. The outer end of each electrode 14 is folded at an angle of about 45° to its longitudinal edges so that the outer end of each electrode protrudes from the same end of the roll as its corresponding longitudinal edge 16. The inner end of each electrode 14 wound up in the capacitor may be folded in the same manner.

In the second example of a partly wound capacitor shown in FIGURE 6, a pair of sheet electrodes 20 and interleaving strips 21 of insulating material are wound up together into a roll, both longitudinal raw edges of each of the electrodes having been screened by double folding each electrode in the manner described. The outer end of each double-folded sheet electrode 20 is folded at an angle of about 45° to its longitudinal edges to form an integral tap 22, the tap of one electrode protruding from one end of the roll and the tap of the other electrode protruding from the other end of the roll. The inner end raw edges of the double-folded sheet electrodes 20 wound up in the capacitor may be completely screened by the manner described with reference to FIGURE 4.

The capacitor of the stack type shown in FIGURE 7 is built up of superposed sheets 24 of metal foil having interleaving layers 25 of dielectric material. The sheets 24 have been double folded in the manner described with reference to FIGURES 1 and 2 in order to screen the longitudinal raw edges of each sheet completely by other parts of the same sheet. One end raw edge of each sheet 24 has also been completely screened by double folding that end of the sheet in the manner described with reference to FIGURE 4. The fourth end of each sheet 24 is left unfolded and is arranged to project from one side of the stack to form a tap, the taps of adjacent sheets projecting from opposite sides of the stack. When the capacitor is assembled, alternate sheets of the superposed sheets 24 are adapted to form one capacitor electrode and the intervening sheets are adapted to form the other electrode by electrically connecting together the taps of the sheets forming each electrode.

In the alternative method of folding a sheet electrode shown in FIGURES 8a and 8b, a sheet 27 of metal foil which is to be the sheet electrode of an electric capacitor has a pair of longitudinal raw edges 28 and a pair of end raw edges 29. By folding the sheet 27 along a line $vv'$ parallel to an equidistant from the longitudinal edges 28, the two raw edges are brought together. On referring to FIGURES 9a and 9b it will be seen that the end raw edge 29 of the single-folded sheet 27 is brought alongside the longitudinal raw edges 28 by folding the sheet along a line $ww'$. As a result of folding each end of the single-folded sheet 27 in this manner all the raw edges of the sheet may be brought together.

The third example of a partly wound capacitor illustrated in FIGURE 10 has a pair of axially staggered sheet electrodes 30 and interleaving strips 31 of insulating material wound up together into a roll. Each of the electrodes 30 has been single-folded in the manner described with reference to FIGURE 8 to bring the longitudinal raw edges 32 together. The outer end of each electrode 30 has been folded in the manner described with reference to FIGURE 9 so that the end raw edge 33 is brought alongside the raw edges 32. The inner end of each electrode 30 wound up in the capacitor may also be folded in the same manner. All the raw edges of one of the electrodes protrude from one end of the roll and all the raw edges of the other electrode protrude from the other end of the roll. Consequently, no raw edges of either electrode are in contact with the insulating strips 31 in the capacitor roll. The protruding edges of each electrode may be used for connection purposes.

In the case where the single-folded sheet 27 is to be an electrode of a capacitor of the stack type, it will be seen, on referring to FIGURES 11a and 11b, that the single-folded sheet is folded a second time along a line $zz'$ at right angles to the first fold to bring its opposite end raw edges 29 together. As a result of double-folding the sheet 27 in this way all the raw edges are brought together along two sides of the sheet.

The capacitor of the stack type shown in FIGURE 12 is built up of superposed sheets 34 of metal foil having interleaving layers 35 of dielectric material, the sheets 34 having been double-folded in the manner described with reference to FIGURE 11. Each sheet 34 is so arranged in the stack that its raw edges 36 protrude from two sides of the stack, the raw edges of alternate sheets of the superposed sheets 34 projecting from the same two sides of the stack. When the capacitor is assembled, alternate sheets of the superposed sheets 34 are adapted to form one capacitor electrode and the intervening sheets are adapted to form the other electrode by electrically connecting together the protruding raw edges of the sheets forming each electrode.

In capacitors and bushings constructed in accordance with the invention, the electrodes are of greater thickness than usual but this disadvantage may be outweighed by the advantage resulting from preventing contact between the raw edges of the electrode and the layer or layers of dielectric lying next to that electrode.

As a result of preventing contact between a raw edge of the electrode and the layer or layers of dielectric lying next to that electrode, the resulting effective edge in contact with the dielectric layer or layers becomes a relatively smooth rounded edge which is not so prone as a raw edge to initiate electrical discharge under operating conditions. In consequence a capacitor in accordance with the invention may be operated at higher stresses than with those of similar form but having electrodes whose raw edges contact the layer or layers of dielectric lying next to the electrodes, without fear of early breakdown initiated by discharges at the raw edges of the electrode. This in turn leads to savings of dielectric materials and hence to a smaller capacitor. Alternatively the improved capacitor may be operated at the same stress as one of similar form but having electrodes whose raw edges contact the layer or layers of dielectric lying next to the electrodes, in which case its noise-free life, which is an important requirement for filter capacitors in telephone circuits, may be considerably lengthened.

What I claim as my invention is:

1. A wound capacitor having two axially staggered convolute electrodes, each formed of a sheet of a material having an electrically conductive surface selected from the group of such sheet materials consisting of metal foil, metallized paper and metallized plastics film, and having evergy raw edge of both electrodes lying outside the electric field of the capacitor, in which one longitudinal raw edge of one electrode protrudes from one end face of the roll, one longitudinal raw edge of the other electrode protrudes from the other end face of the roll, the other longitudinal raw edge of each electrode lies within the roll, each sheet being folded along a line extending lengthwise of and near to the longitudinal raw edge lying within the roll and along a second line extending lengthwise of and spaced further from said raw edge to cause that same raw edge to lie between two overlying parts of the same electrode and be screened thereby, and at least one of the electrodes is folded at an angle of about 45° to its longitudinal edges at at least one of its ends so that said end protrudes from the same end face of the roll as the protruding longitudinal edges of the electrode.

2. A wound capacitor having two convolute electrodes each formed of a sheet of a material having an electrically conductive surface selected from the group of such sheet materials consisting of metal foil, metallized paper and metallized plastics film, and having every raw edge of both electrodes lying outside the electric field of the capacitor, in which each sheet is folded along a pair of lines, each line extending lengthwise of and near to one of the longitudinal raw edges of the sheet and is folded along a second pair of lines, each of which extends lengthwise of and is spaced further from said edge, to cause each of the longitudinal raw edges to lie between two overlying parts of the same electrode and be screened thereby, and at least one of the sheets is folded at an angle of about 45° to its longitudinal edges at at least one of its ends to form an integral tap protruding from an end of the wound capacitor.

3. A wound capacitor having two convolute electrodes each formed of a sheet of a material having an electrically conductive surface selected from the group of such sheet materials consisting of metal foil, metallized paper and metallized plastics film, and having every raw edge of both electrodes lying outside the electric field of the capacitor, in which each sheet is folded along a pair of lines, each line extending lengthwise of and near to one of the longitudinal raw edges of the sheet and is folded along a second pair of lines, each of which extends lengthwise of and is spaced further from said edge, to cause each of the longitudinal raw edges to lie between two overlying parts of the same electrode and be screened thereby, and one end of at least one of the sheets is folded at an angle of about 45° to its longitudinal edges to form an integral tap protruding from one end of the wound capacitor and the other end of the sheet is twice folded along lines at right angles to its longitudinal edges so as to completely screen said end raw edge of the sheet by other parts of the same sheet.

4. A wound capacitor as claimed in claim 3, in which the corners of that end of the sheet which is twice folded at right angles to its longitudinal edges are folded over before the end is so twice folded in order to eliminate the risk of the corners protruding laterally of the twice folded end.

References Cited in the file of this patent

UNITED STATES PATENTS

| | | |
|---|---|---|
| 1,248,829 | Dick | Dec. 4, 1917 |
| 2,492,166 | Marco | Dec. 27, 1949 |
| 2,891,204 | Kuhn | June 16, 1959 |